(12) United States Patent
Kato (10) Patent No.: US 6,540,619 B2
(45) Date of Patent: Apr. 1, 2003

(54) BOLT AND A MANUFACTURING METHOD THEREOF

(75) Inventor: Takashi Kato, Nagoya (JP)

(73) Assignee: Meidoh Co., Ltd., Toyota (JP)

( * ) Notice: Subject to any disclaimer, the term of this patent is extended or adjusted under 35 U.S.C. 154(b) by 0 days.

(21) Appl. No.: 10/013,969

(22) Filed: Dec. 11, 2001

(65) Prior Publication Data

US 2002/0042302 A1 Apr. 11, 2002

Related U.S. Application Data (62) Division of application No. 09/619,880, filed on Jul. 20, 2000, now Pat. No. 6,347,917.

(30) Foreign Application Priority Data

Sep. 27, 1999 (JP) ............................................. 11-272193
Dec. 13, 1999 (JP) ............................................. 11-353565
Apr. 17, 2000 (JP) .......................................... 2000-084526

(51) Int. Cl.[7] ................................................. B21H 3/02
(52) U.S. Cl. .............................. 470/11; 470/10; 470/16
(58) Field of Search ........................... 470/8, 9, 10, 11, 470/12, 16

(56) References Cited

U.S. PATENT DOCUMENTS

| | | | | |
|---|---|---|---|---|
| 3,479,675 A | * | 11/1969 | Ricca ........................... | 470/10 |
| 3,526,914 A | * | 9/1970 | Breed ........................... | 470/12 |
| 4,369,552 A | * | 1/1983 | Sugiyama ..................... | 470/12 |
| 5,842,923 A | * | 12/1998 | Umemura et al. ............ | 470/10 |

* cited by examiner

Primary Examiner—Ed Tolan
(74) Attorney, Agent, or Firm—Cooper & Dunham LLP; Donald S. Dowden (57) ABSTRACT

The object of the present invention is to prevent the encroaching and the seizure between the bolt and the female screw caused by an oblique screwing of the bolt into the female screw when the bolt and the female screw are fastened together. Another object of the present invention is to manufacture the bolt in a low cost, by using said bolt, the encroaching and the seizure between the bolt and the female screw caused by a oblique screwing of the bolt into the female screw are certainly prevented. Said objects may be attained by a bolt consisting of a column part and a polygonal pillar part extending from an end of said column part wherein a complete thread is formed on said column part and a screw blade continuing to said complete thread is formed on said polygonal pillar part.

3 Claims, 9 Drawing Sheets

1: Bolt   3: Column part   4: Hexagonal pillar part
5A: Complete thread   5B: Screw blade   6: Column guide
boss   51B: Frontmost end

FIG. 14
PRIOR ART

BOLT AND A MANUFACTURING METHOD THEREOF

This application is a divisional of Ser. No. 09/619,880, filed Jul. 20, 2000, now U.S. Pat. No. 6,347,917.

FIELD OF THE INVENTION

The present invention relates to a bolt screwing into a female screw stripping the thick coating film or the spatter from said female screw, more particularly a bolt consisting of a column part and a polygonal pillar part extending from an end of said column part wherein a complete thread is formed on said column part and a screw blade continuing to said complete thread is formed on said polygonal pillar part. Further, the present invention relates to a manufacturing method of said bolt comprising; molding a green bolt body having a column part and a polygonal pillar part by forging work, and forming a complete thread on said column part and a screw blade on said polygonal pillar part at the same time by the thread rolling process.

DESCRIPTION OF THE PRIOR ART

A thick coating film for anti-corrosion is formed on the female screw by cation coating. Hitherto, it has been a problem that when the bolt is screwed into said female screw, said thick coating film may clog in the thread of the bolt resulting in the seizure of the bolt to the female screw.

Figure 14:
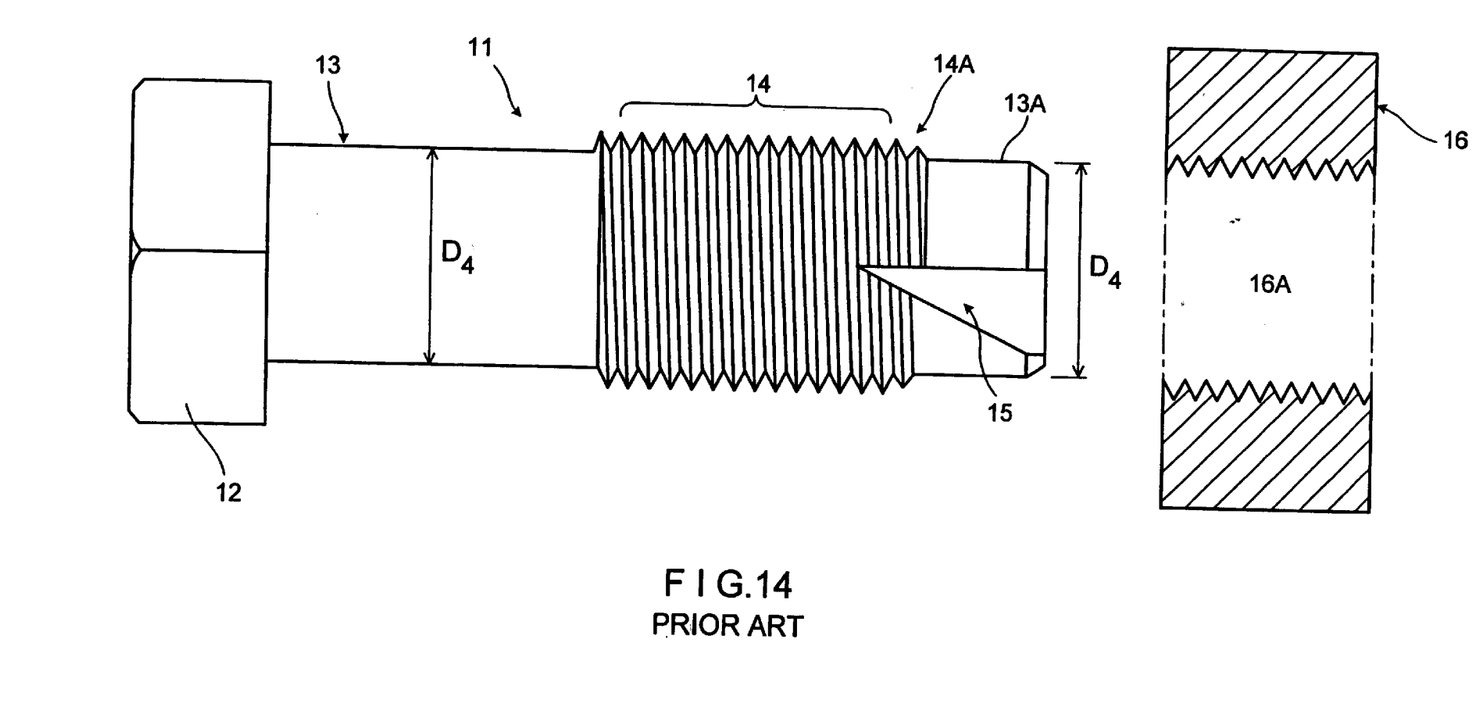
FIG. 14 is a side view of a conventional embodiment.

To prevent the seizure of the bolt when the bolt is screwed into the female screw, a bolt having a notch at its end shown in FIG. 14 has been provided. Said bolt (11) consists of a head (12) and a column part (13) on which a thread is formed and said notch (15) is formed at the end part (13A) of said column part (13), wherein said column part (13) and said end part (13A) have the same diameter $D_4$ respectively. When said bolt (11) is screwed into the tapped hole of the female screw (14) to which the thick film by the cationic coating, the spatter and the like adhere, said thick coating film, the spatter and the like may be stripped and removed by said notch (15) of said bolt (11).

Nevertheless, since said notch has an asymmetric trigonal shape spreading its width toward the top end of the bolt, so that a lot of part of the thread (14A) formed on the top end part of the bolt is incomplete, said bolt having a notch has a fault that the encroaching and the seizure between the bolt and the female screw are caused by an oblique screwing of the bolt into the female screw when the bolt and the female screw are fastened together.

Further, it is feared that the producting cost becomes high since 2 processes, forming a thread on the green bolt body by the thread rolling process and forming the notch on the bolt by the cutting work process, are necessary to manufacture said bolt having a notch.

OBJECT OF THE INVENTION

The object of the present invention is to prevent the encroaching and the seizure between the bolt and the female screw caused by an oblique screwing of the bolt into the female screw when the bolt and the female screw are fastened together.

Another object of the present invention is to manufacture the bolt in a low cost, by using said bolt, the encroaching and the seizure between the bolt and the female screw caused by a oblique screwing of the bolt into the female screw will certainly be prevented.

SUMMARY OF THE INVENTION

Said objects may be attained by a bolt consisting of a column part and a polygonal pillar part extending from an end of said column part wherein a complete thread is formed on said column part and a screw blade continuing to said complete thread is formed on said polygonal pillar part.

Preferably, said complete thread of said column part and said screw blade of said polygonal pillar part have the same pitch respectively and said screw blade consists of a plural number of blade units spirally continuing respectively, each blade unit consists of a crest part situating at the corner of said polygonal pillar part and a flank part situating at the side of said polygonal pillar part.

Further, it is preferable that the full diameter of said screw blade of said polygonal pillar part is set to be equal to, or a little larger or a little smaller than, the full diameter of said complete thread of said column part.

Still further, it is preferable that a guide boss having a smaller diameter than said column part is extended from the end of said polygonal pillar part and a spiral guide groove is formed on said guide boss, said spiral guide groove has the same pitch as the root of said complete thread of said column part and said guide groove is partially deeper than the root of said complete thread.

The end of said guide groove has preferably a discharging groove to discharge the scobe extending from the flank part of said screw blade along the axis of said bolt crossing said guide groove of said guide boss and preferably said polygonal pillar part is trigonal to dodecagonal.

Further, said objects may be attained by a manufacturing method of a bolt comprising; molding a green bolt body having a column part and a polygonal pillar part by forging work, and forming a complete thread on said column part and a screw blade on said polygonal pillar part at the same time by the thread rolling process.

Preferably, a guide boss having a smaller diameter than said column part is formed at the end of said polygonal pillar part by the drawing process at the same time when said complete thread and said screw blade are formed by the thread rolling process and a spiral guide groove is formed on said guide boss by the thread rolling process at the same time when said guide boss is formed by the drawing process so that said spiral guide groove has the same pitch as the root of said complete thread of said column part and said guide groove is partially deeper than the root of said complete thread.

Since a complete thread (5A) screwing into a female screw (7) is formed on the column part in said bolt of the present invention, and a screw blade (5B) is formed on the polygonal pillar part (4), when said bolt (1) is screwed into a female screw (7), first said screw blade (5B) scrapes the thick film by the cationic coating, the spatter and the like adhering to said female screw (7) and then the complete thread (5A) of the column part of said bolt (1) engages said female screw (7)

BRIEF DESCRIPTION OF THE DRAWINGS

FIGS. 1~2 and FIGS. 6~11 relate to an embodiment of the present invention.

DETAILED DESCRIPTION

Figure 1:
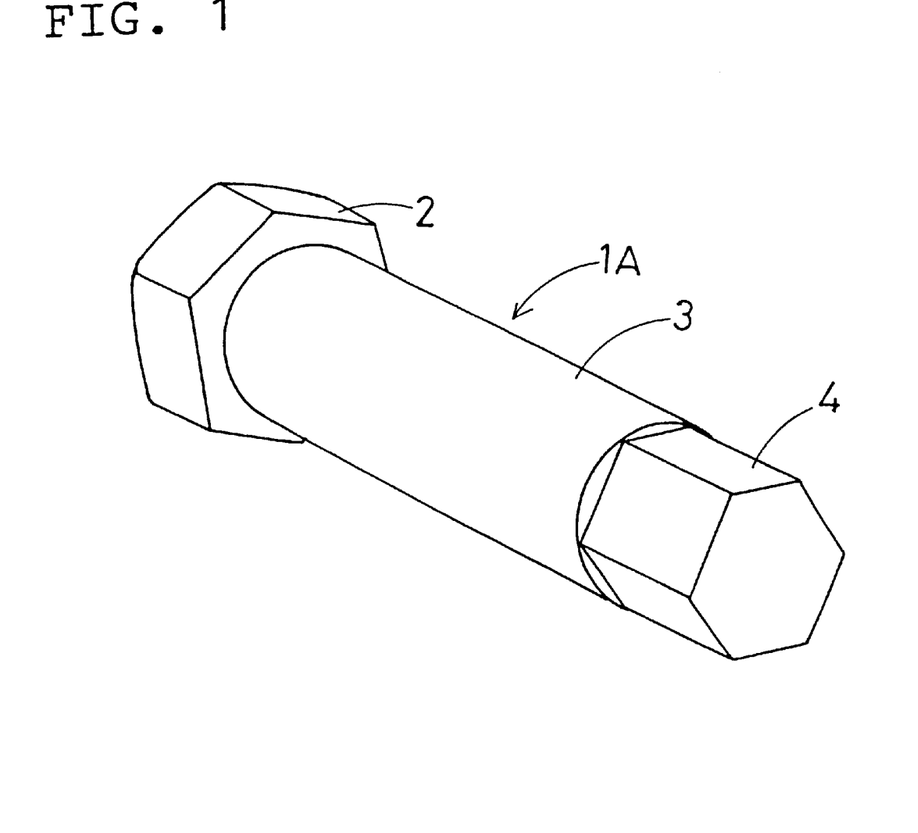
FIG. 1 is a perspective view of a green bolt body.
Figure 2:
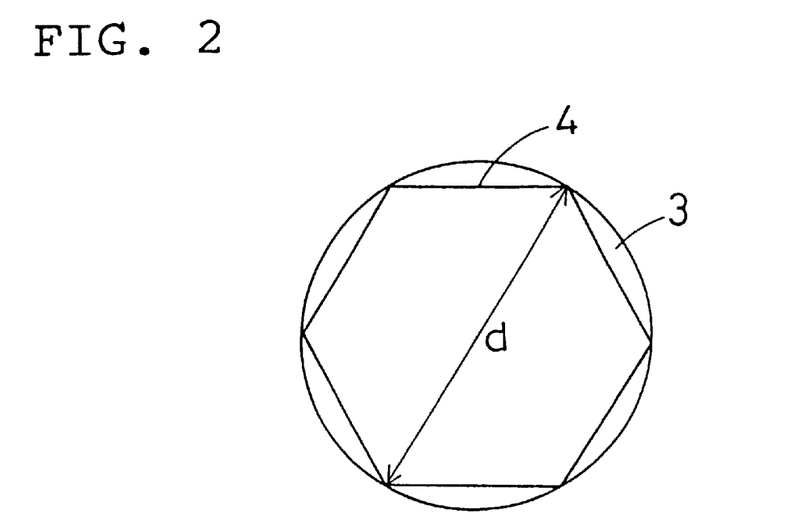
FIG. 2 is an illustration of a hexagonal pillar part and a column part.
Figure 3:
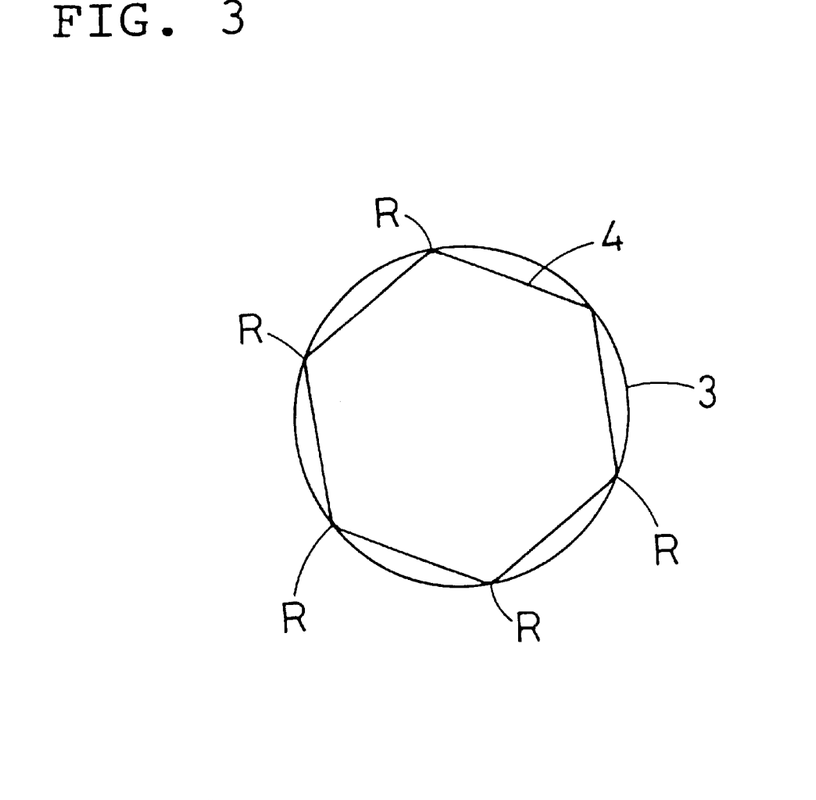
FIG. 3 is an illustration of a hexagonal pillar part and a column part of another embodiment.
Figure 4:
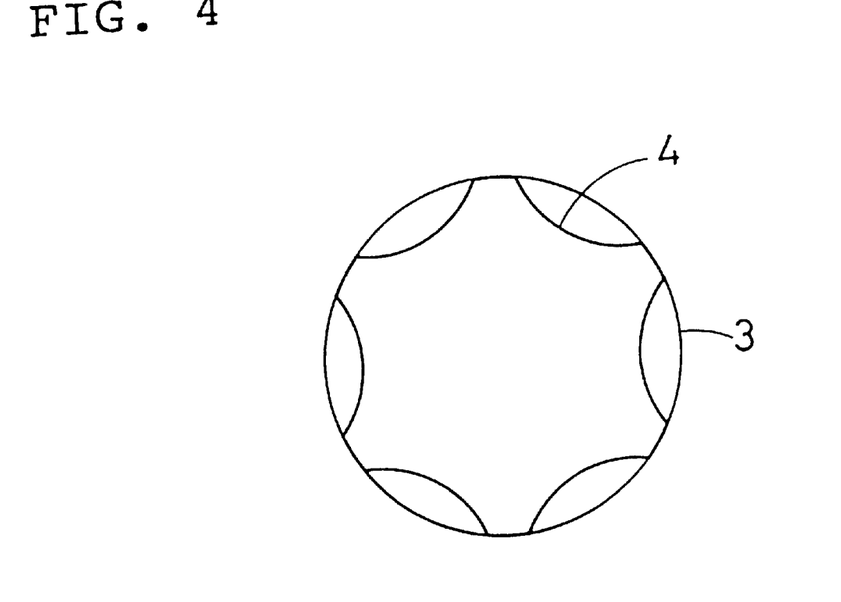
FIG. 4 is an illustration of a (hexagonal) pillar part and a column part of a further embodiment.
Figure 5:
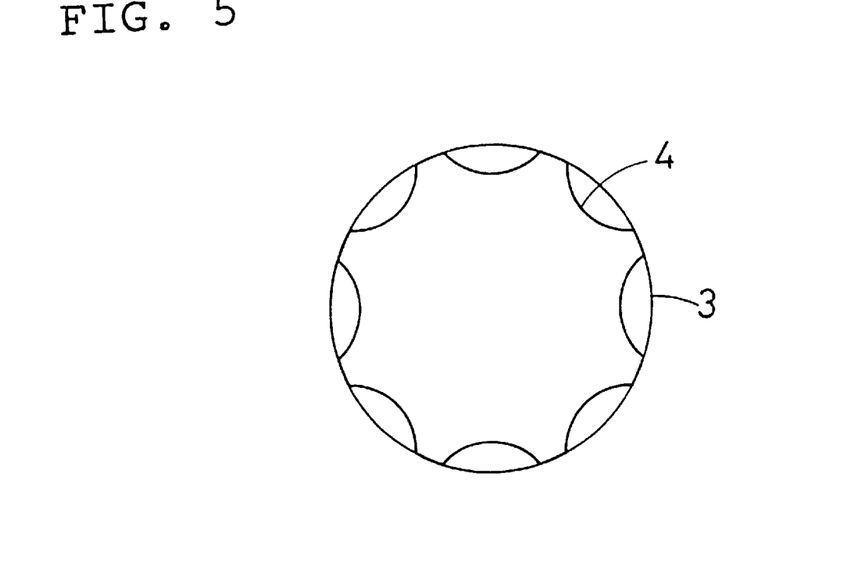
FIG. 5 is an illustration of a (octagonal) pillar part and a column part of a furthermore embodiment.
Figure 6:
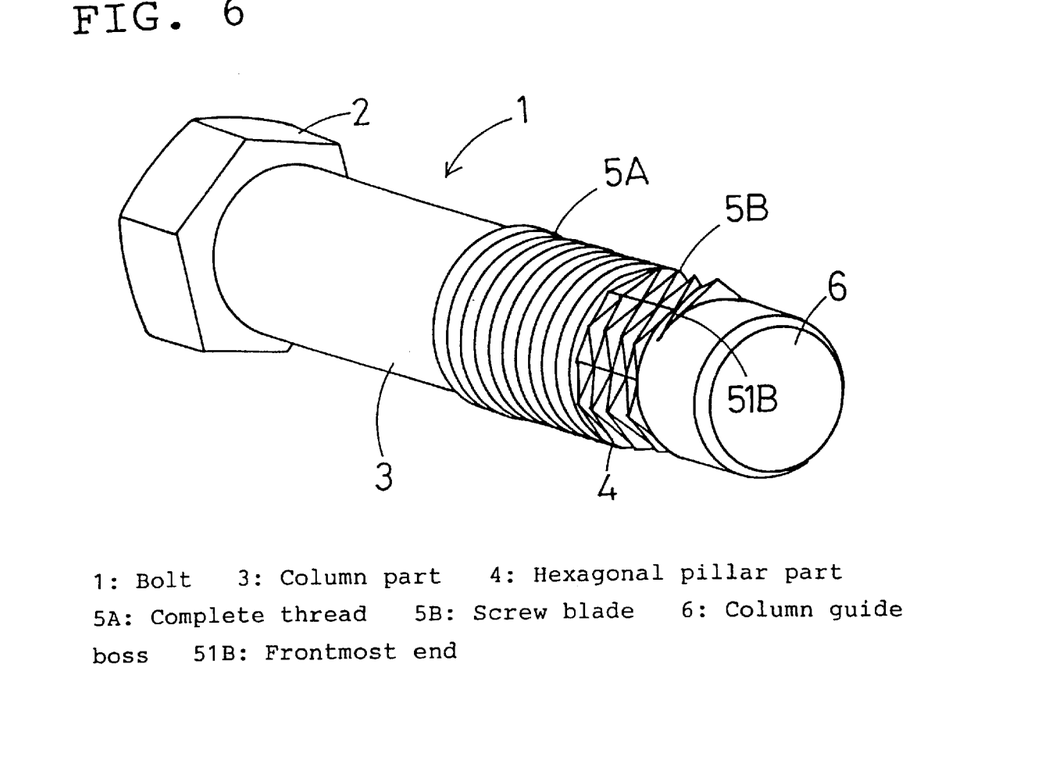
FIG. 6 is a perspective view of a bolt.

Referring now to FIG. 1 to FIG. 11, a green bolt body (1A) having a head (2), a column part (3), and a hexagonal pillar part (4) is made by forging work such as punching work by using a column material of metal such as steel and the like. As shown in FIG. 2, the diameter d of said column part (3) of said green bolt body (1A) is to be substantially equal to the diagonal diameter d of said hexagonal pillar part (4). Said polygonal pillar part (4) may be preferably trigonal to dodecagonal and more preferably hexagonal or octagonal. The shape of the corners of said polygonal pillar part (4) may be angular or round. The polygonal pillar part (4) having the round shaped corners as shown in FIG. 3 has advantages of the present invention and further the forging mold forming the round shaped corners of the polygonal pillar part (4) has a long life. Still further, the round shape of the corners of said polygonal pillar part (4) may be set to correspond with the round shape of said column part (3) and the sides of said polygonal pillar part (4) may have a concave shape as shown in FIG. 4 and FIG. 5. Above described shape of said polygonal pillar part (4) is included in the polygonal shape defined in the present invention. In a case where a screw blade mentioned later is formed on said polygonal pillar part (4) having a shape shown in FIG. 4 and FIG. 5, said screw blade may be sharp having an excellent scraping effect of the coating film on the female screw.

Said green bolt body (1A) is then effected by the thread rolling process to form threads (5A, 5B) on said column part (3) and said polygonal piller part (4) at the same time and further a column guide boss (6) is formed at the end of said polygonal piller part (4) by the drawing process at the same time.

As above mentioned, a bolt (1) of the present invention is simply manufactured in a low cost by effecting the thread rolling process and the drawing process at the same time.

Figure 10:
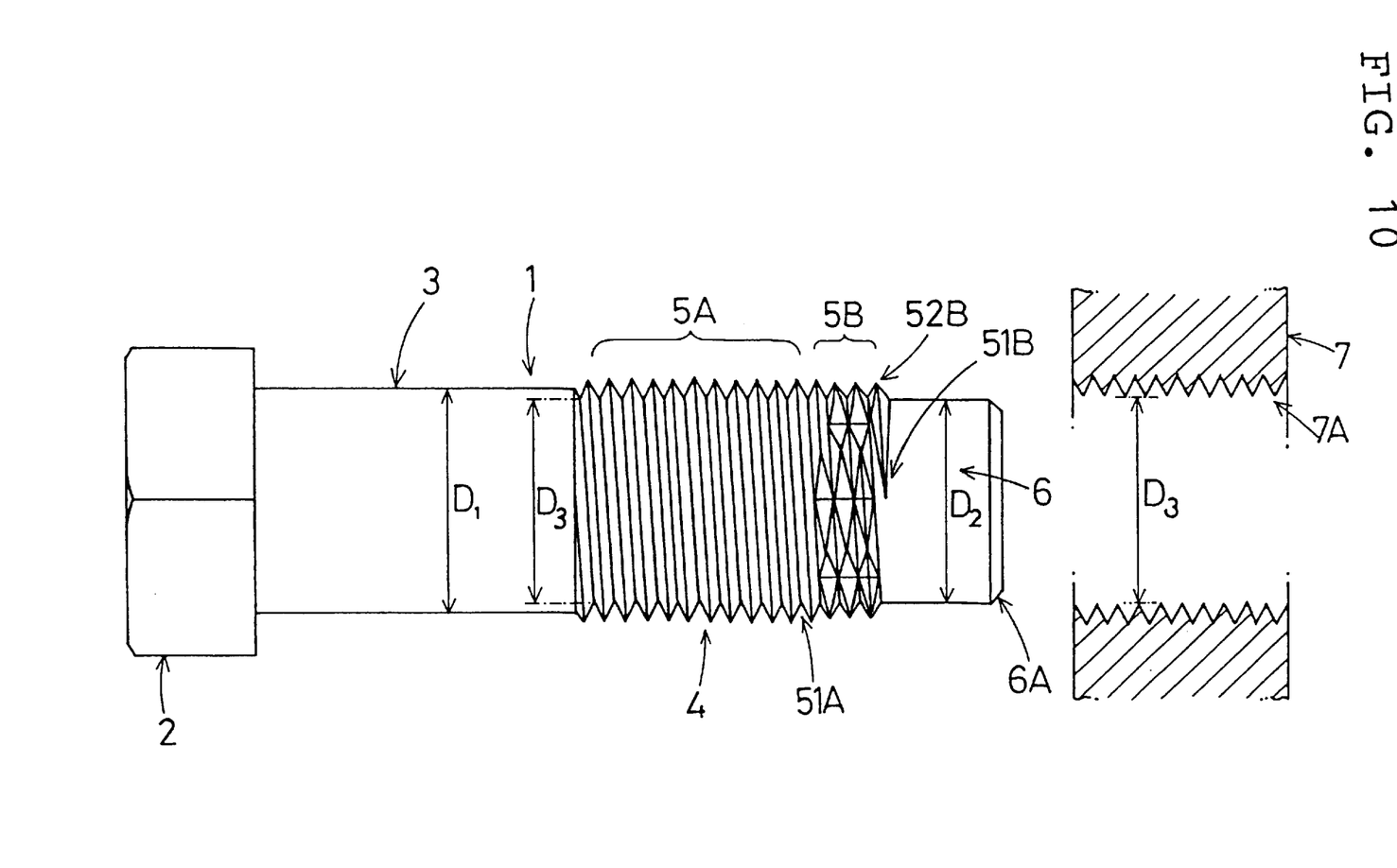
FIG. 10 is an illustration of the side showing before the bolt is screwed into the female screw.

As shown in FIG. 10, the diameter $D_2$ of said guide boss (6) is set to be a little smaller than the diameter $D_1$ of said column part (3) and equal to or a little smaller than the core diameter $D_3$ of said complete thread (5A). Further the circumference (6A) of the end of said guide boss (6) is preferably chamfered. Alternatively in a case where a lot of spatter adheres to the thread of the female screw, the circumference (6A) of the end of said guide boss (6) is preferably kept to be blade shaped without chamfering.

Figure 7:
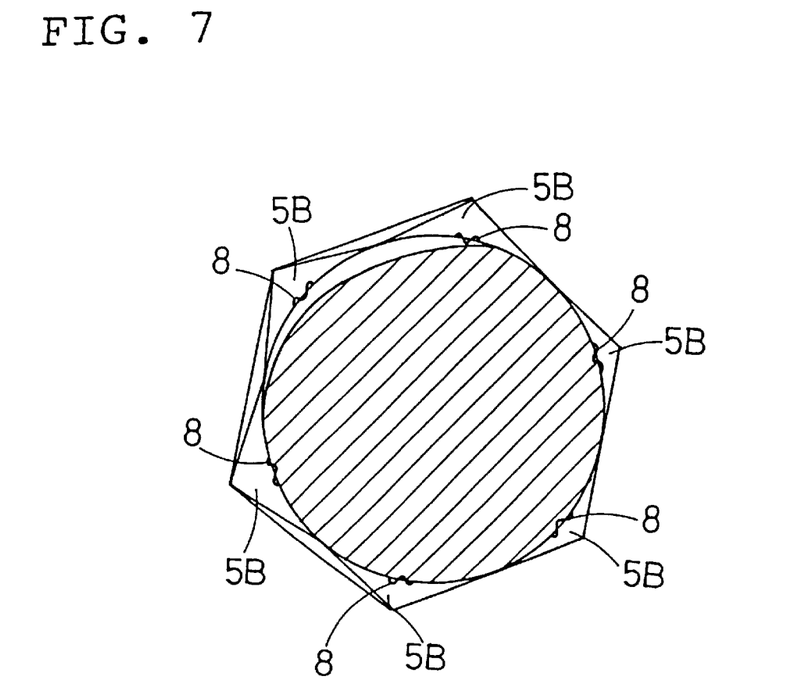
FIG. 7 is a perspective illustration of a screw blade.

In said bolt (1), the thread (5A) formed on said column part (3) is the complete thread screwing into the female screw and the thread rolling effects on the corners of said hexagonal pillar part (4) and as a result, in blade units, each of which consisting of a crest part (50B) and a flank part (53B), formed on said hexagonal pillar part (4), the crest part (50B) is situated at the corner of said hexagonal pillar part (4) and the flank part (53B) is situated at the side of said hexagonal pillar part (4) and a plural number of said blade units spirally continue to form a screw blade (5B) as shown in FIG. 7.

Figure 8:
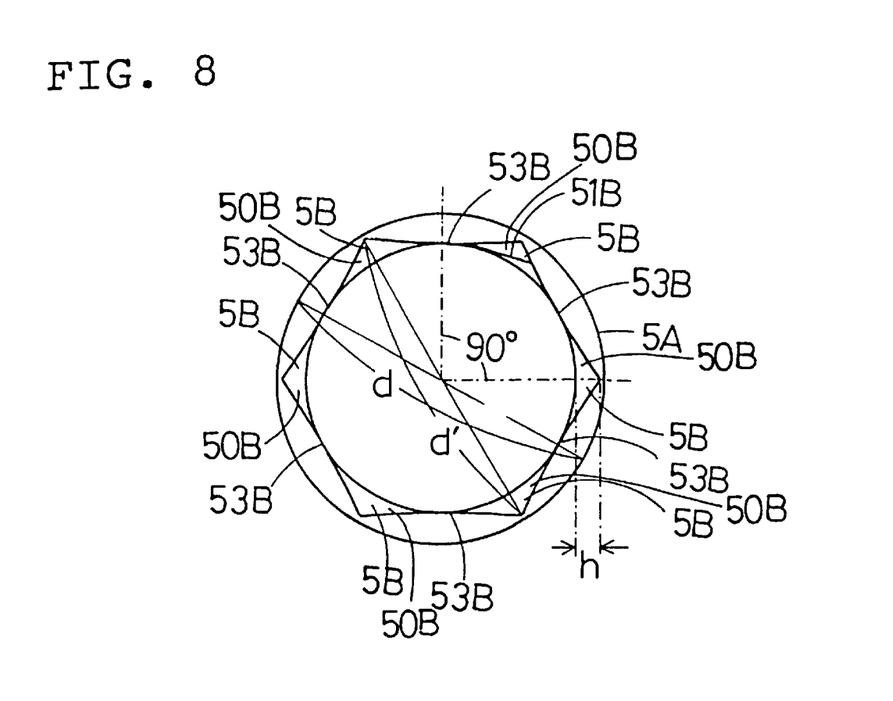
FIG. 8 is an illustration of a complete thread and a screw blade.

Further, said screw blade (5B) increases gradually its height from 0 to a height a little lower than the height of the complete thread (5A) of said column part (3) within a range between its frontmost (51B) and a position revolving 95°, preferably 90° from its frontmost as shown in FIG. 8. Accordingly, the full diameter d' of said screw blade (5B) is a little smaller than the full diameter d of said complete thread (5A) of said column part (3). Said screw blade (5B) has preferably 2 to 4 pitches and the flank part (535) of said blade unit has preferably a concave shape to give a sharp shape to the crest part (50B).

Figure 9:
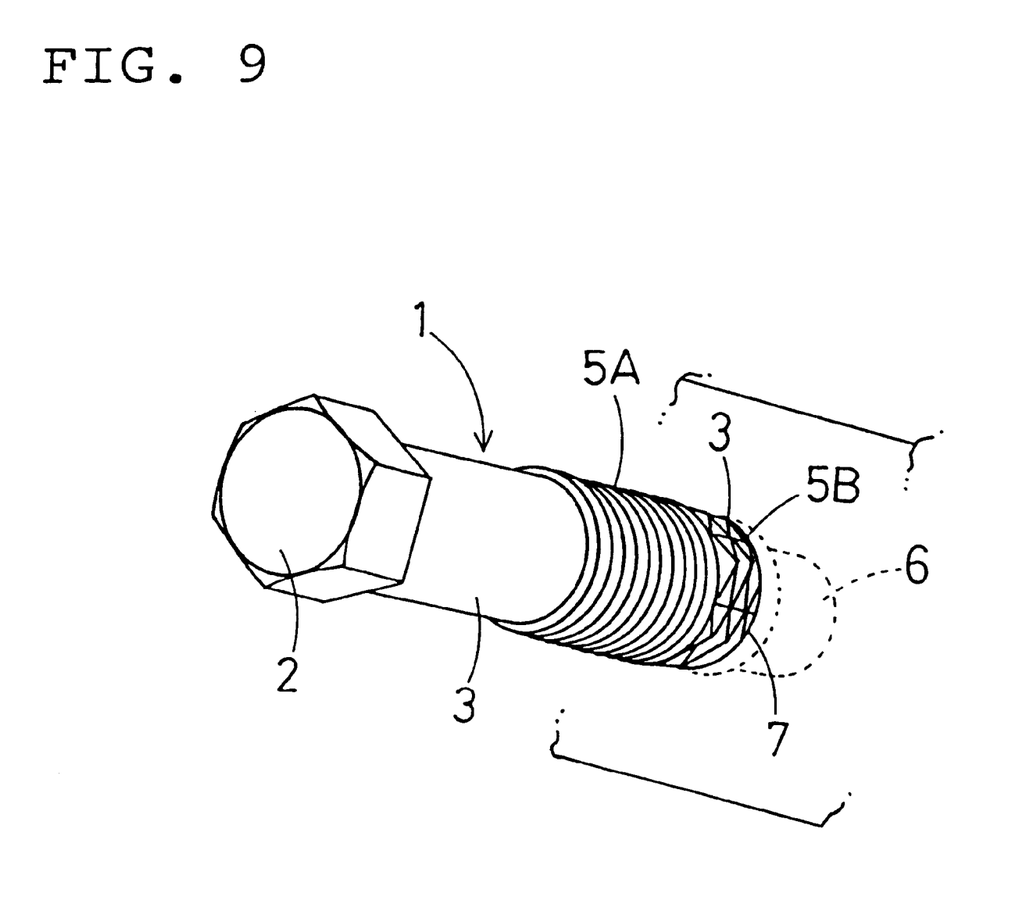
FIG. 9 is a perspective view showing that the bolt is screwed into the female screw.
Figure 11:
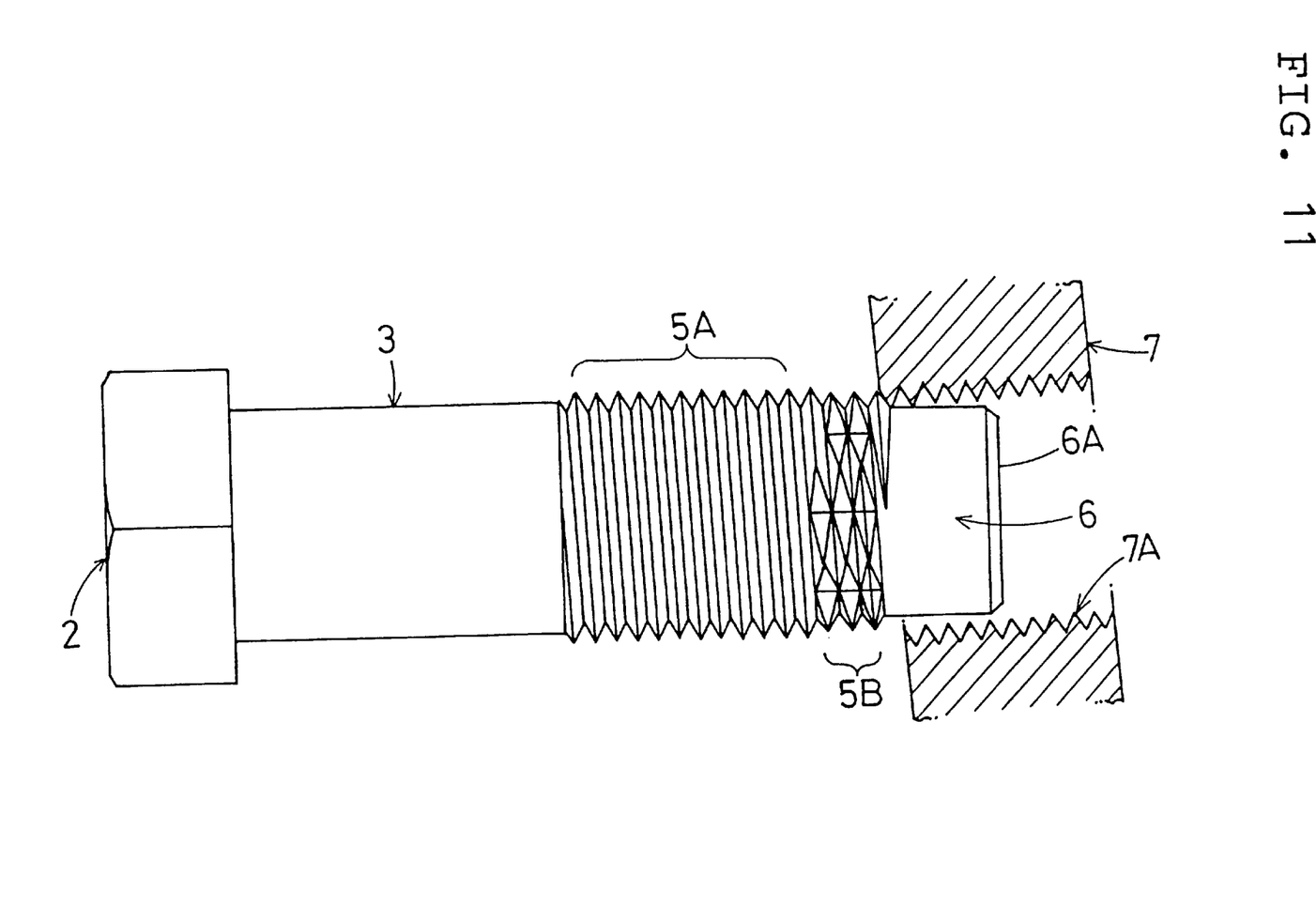
FIG. 11 is an illustration of the side showing that the bolt is screwed into the female screw.

When said bolt (1) is screwed into a female screw (7) as shown in FIG. 9 to FIG. 11, first, said bolt (1) is guided into said female screw (7) by the guide boss (6) having a diameter a little smaller than the diameter of said column part (3) and then the screw blade (5B) of said polygonal pillar part (4) is engaging with the thread (7A) of said female screw (7). Since the diameter d' of said screw blade (5B) is set to be a little smaller than the diameter d of said complete thread (5A) as above described and the diameter $D_2$ of said guide boss (6) is set to be equal to or a little smaller than the core diameter $D_3$ of the thread (7A) of said female screw (7), in a case where said bolt (1) is obliquely screwed into said female screw (7), said oblique screwing is corrected.

If the incomplete thread of said female screw (7) encroaches to said screw blade (5B), the incomplete thread of said female screw (7) easily gets out of the crest part (50B) of the blade unit of said screw blade (5B) to prevent certainly encroaching of the incomplete thread of said female screw (7) to said screw blade (5B). Since the crest parts (50B) are situated at the corners of said polygonal pillar part (4) the width of each crest part (50B) is small and the diameter d' of said screw blade (5B) is a little smaller than the complete thread (5A) of said column part (3).

Above described encroaching/getting of the incomplete thread of said female-screw (7) into/out of the crest part (50B) of the blade unit is repeated when said bolt (1) is screwed into said female screw (7) resulting in the normal fastening between said bolt (1) and said female screw (7).

Further since said screw blade (5B) increases gradually its height from its frontmost (51) 0 to the height of the complete thread (5A) of said column part (3) to be a complete thread and the diameter $D_2$ of said guide boss (6) is a little smaller than the core diameter $D_3$ of the thread (7A) of said female screw (7), there is the possibility of oblique screwing of said bolt (1) into said female screw (7) caused by the play between said guide boss (6) and said female screw (7) even if the oblique screwing of said bolt (1) into said female screw (7) is corrected by the guide boss (6). Nevertheless, even in this case, the encroaching between the thread of said bolt (1) and the thread of said female screw (7) caused by the gap of the pitch is prevented by the frontmost (51B) of said screw blade (5B) increasing its height from 0 to the height of the complete thread (5A) of said column part (3).

As above described, the encroaching and the seizure caused by oblique screwing of the bolt is entirely and effectively prevented and further the coating film, the spatter, and the like adhering to the thread (7A) of said female screw (7) are scraped by the screw blade (5B) of the polygonal pillar part (4) of said bolt (1). As shown in FIG. 3, said scraped coating film and the like collected at in the root of said screw blade (5B) and the complete thread (5A) of the column part (3) continuing from the screw blade (5B) of said hexagonal pillar part (4) is engaging with the thread (7A) of said female screw (7) from which said coating film and the like are scraped. Accordingly, the loading of the complete thread (5A) is prevented and the increase of the coefficient of friction caused by the loading of the complete thread (5A) is also prevented, as a result, a stable axial force is ensured and the seizure caused by said loading is effectively prevented.

Further, said guide boss (6) may be polygonal shaped besides column shaped, and in a case where said guide boss (6) is polygonal shaped, the corner of said guide boss (6) may be angular or round. Further the bolt of the present invention may be manufactured by another methods besides the above described method. For instance said guide boss (6) may be previously formed at the top end of the polygonal pillar part in the green bolt body (1A) alternatively forming said guide boss (6) by the drawing process.

Further said screw blade (5B) may be formed by cutting work after thread rolling of the column part although the manufacturing cost may be more expensive.

Figure 12:
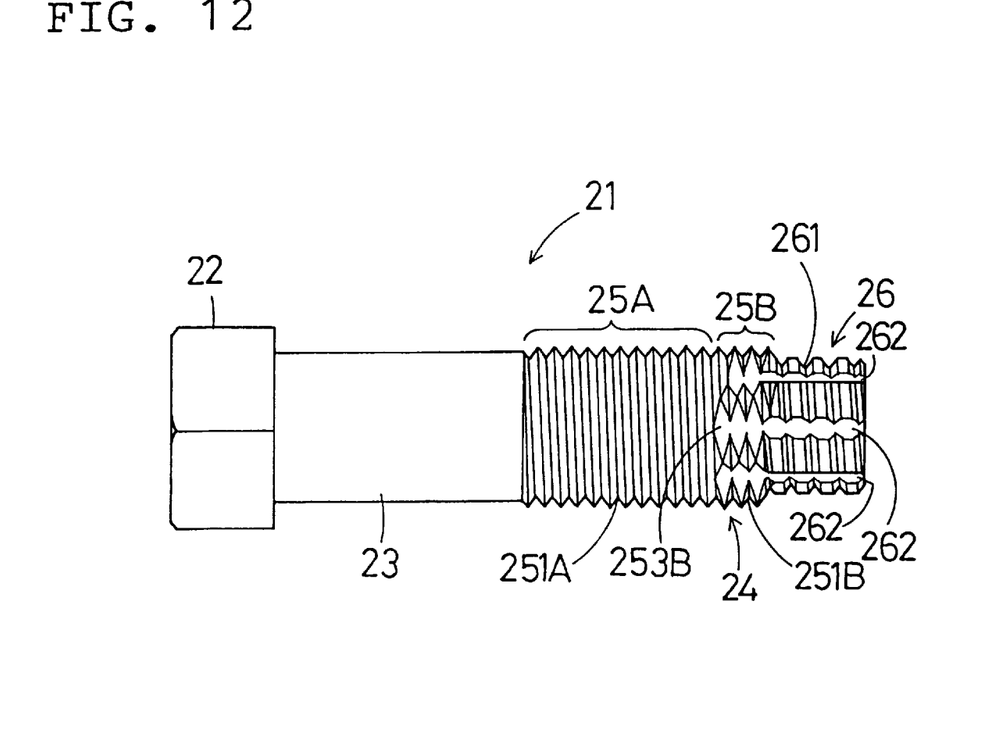
FIG. 12 is a side view of a bolt of another embodiment.
Figure 13:
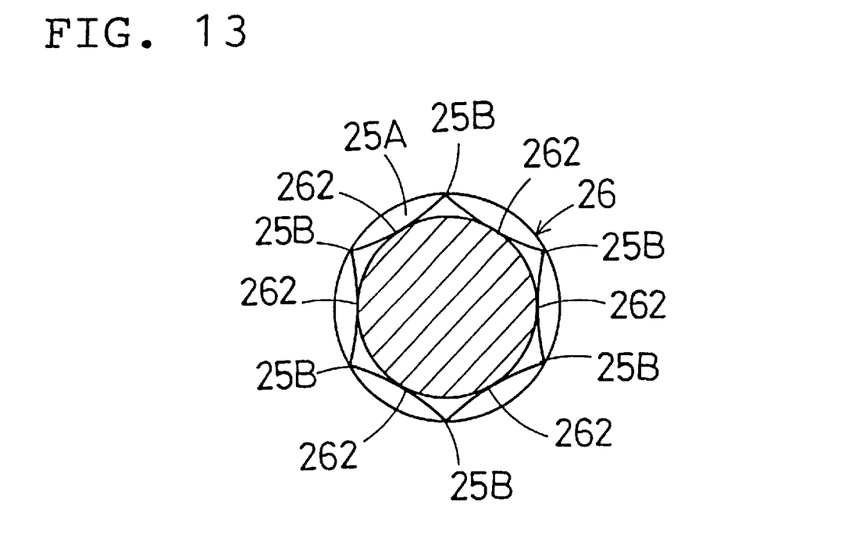
FIG. 13 is a cross-sectional view of the bolt of FIG. 12.

FIG. 12 and FIG. 13 relate to another embodiment of the present invention. In this embodiment, a bolt (21) consists of a head (22), a column part (23) having a complete thread (25A), a polygonal pillar part (24) having a screw blade (25B), and a guide boss (26) formed at the top end of said polygonal pillar part (24) wherein said guide boss (26) has a hexagonal pillar shape while said guide boss (6) has a column shape in the previous embodiment. Further a spiral guide groove (261) is formed on said guide boss (26) wherein said guide groove continues to the root (251B) of said screw blade (25B) of said polygonal pillar part (24) and has the same pitch as the complete thread (25A) and the screw blade (25B).

Further a plural number of discharging groove (262) are formed on said guide boss (26) wherein said discharging grooves (262) extend from the flank part (253B) of said screw blade (25B) along the axis of said bolt (21) crossing said guide groove (261) and said guide groove (261) and said guide groove (261) is set to be deeper than the root (251A) of said complete thread (25A) excepting the parts where said discharging grooves (262) cross. The scobs such as the scraped coating film and the spatter are discharged from said discharging grooves (262). The depth of said guide groove (261) is preferably 10 to 70% of the height of the thread of the female screw into which said bolt (21) is screwed. In this embodiment, the diameter of said screw blade (25B) is set to be equal to the diameter of said complete thread (25A) of said column part (23).

As above described, in a case where said guide groove (261) is formed on said guide boss (26), and when said bolt (21) is obliquely screwed into the female screw, the thread of said female screw engages to said guide groove (261) of said guide boss (26) during screwing said bolt (21) into said female screw, and said screw whose thread engages said guide groove (261) is propelled toward the column part (23) of said bolt (21) being guided by said guide groove (261) since the guide groove (261) is formed on said guide boss (26) of said bolt (21) when the frontmost end of the thread of the female screw reaches the rear most end of the guide groove (261), then the thread of the female screw transfers to said screw blade (25B) from said guide groove (261) to engage to said screw blade (25B) and the oblique screwing of said bolt (21) is corrected. The thread of the female screw further transfers to the complete thread (25) of said column Part (23) from said screw blade (25B).

As above described, the oblique screwing of said bolt (21) is corrected and the thread of said bolt normally engages to the thread of the female screw to prevent the encroaching, the seizure, or the racing caused by the oblique screwing of said bolt (21), and the coating film, the spatter, and the like adhering to the thread of the female screw are more effectively scraped than the previous embodiment since the diameter of said screw blade (25B) is set to be equal to the diameter of the complete thread of said column part (23) in this embodiment. Nevertheless, in a case where the diameter of said screw blade is set to be a little smaller than the diameter of the complete thread in this embodiment, the encroaching, the seizure, and the like caused by the oblique screwing are more effectively prevented.

Further, since said boss (26) has the discharging groove (262) crossing to said guide groove (261) in this embodiment, when said bolt (21) is screwed into the female screw, the scobs which are the coating film, the spatter, and the like scraped from the thread of the female screw can be discharged from said discharging groove (262) to effectively prevent the loading and the seizure caused by the loading. Nevertheless the present invention is not limited to this embodiment and the guide boss (26) may be column shaped without the discharging groove and further the corners of said guide boss may be round or angular.

It is to be understood that the invention is not limited to the procedures and embodiments hereinabove specifically set forth, but may be carried out in other ways without departure from its spirit. For instance, the head of the bolt may have another shape besides the hexagonal shape and the head may have the flange and further the bolt may be a stud bolt without a head.

In the present invention, the coating film, the spatter and the like adhering to the thread of the female screw are scraped by the screw blade of the polygonal pillar part of the bolt, and then the complete thread of the bolt is screwed to the thread of the female screw so that the loading of the complete thread is prevented and further the pertinent clamp torque is ensured without increase of the friction force. As a result the seizure caused by the loading of the complete thread is effectively prevented and the bolt can be smoothly screwed into the female screw in the present invention.

I claim:

1. A manufacturing method of a bolt comprising molding a green bolt body having a column part and a polygonal pillar part by forging work, and forming a complete thread on said column part and a sharp pointed screw blade on said polygonal pillar part at the same time by a thread rolling process.

2. A manufacturing method of a bolt in accordance with claim 1 wherein a guide boss having a smaller diameter than said column part is formed at the end of said polygonal pillar part by a drawing process at the same time when said complete thread and said screw blade are formed by the thread rolling process.

3. A manufacturing method of a bolt comprising molding a green bolt body having a column part and a polygonal pillar part by forging work, and forming a complete thread on said column part and a screw blade on said polygonal pillar part at the same time by a thread rolling process wherein a guide boss having a smaller diameter than said column part is formed at the end of said polygonal pillar part by a drawing process at the same time when said complete thread and said screw blade are formed by the thread rolling process and a spiral guide groove is formed on said guide boss by the thread rolling process at the same time when said guide boss is formed by the drawing process so that said spiral guide groove has the same pitch as the root of said complete thread of said column part and said guide groove has a part that is deeper than the root of said complete thread.

* * * * *